US010599406B2

(12) United States Patent
Ji et al.

(10) Patent No.: US 10,599,406 B2
(45) Date of Patent: *Mar. 24, 2020

(54) GENERATING EXECUTABLE FILES THROUGH COMPILER OPTIMIZATION

(71) Applicant: INTERNATIONAL BUSINESS MACHINES CORPORATION, Armonk, NY (US)

(72) Inventors: Jin Song Ji, Ponte Vedra, FL (US); Ke Wen Lin, Shanghai (CN); Zhao Wu, Sichuan (CN); Qing S. Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/109,108

(22) Filed: Aug. 22, 2018

(65) Prior Publication Data
US 2018/0364993 A1 Dec. 20, 2018

Related U.S. Application Data

(63) Continuation of application No. 15/173,366, filed on Jun. 3, 2016, now Pat. No. 10,133,559.

(51) Int. Cl.
G06F 9/44 (2018.01)
G06F 8/41 (2018.01)

(52) U.S. Cl.
CPC .................... G06F 8/443 (2013.01)

(58) Field of Classification Search
CPC ....................................... G06F 8/443
See application file for complete search history.

(56) References Cited

U.S. PATENT DOCUMENTS

| 6,041,180 | A  | 3/2000 | Perks et al. |
| 6,405,368 | B1 | 6/2002 | Freyburger |
| 6,760,905 | B1 | 7/2004 | Hostetter et al. |
| 8,458,681 | B1 | 6/2013 | Coutant et al. |
| 8,510,727 | B2 | 8/2013 | Lobo et al. |

FOREIGN PATENT DOCUMENTS

WO 2007099324 A1 9/2007

OTHER PUBLICATIONS

List of IBM Patents or Patent Applications Treated as Related dated Aug. 22, 2018, 2 pages.

Primary Examiner — Hang Pan
(74) Attorney, Agent, or Firm — Tutunjian & Bitetto, P.C.; Scott S. Dobson

(57) ABSTRACT

Embodiments of the present invention may track a user's interaction trajectory associated with a problem occurred on a website. According to an embodiment of the present invention, a first symbol of a first definition associated with a first object file is obtained. Then, in response to the first symbol matching a second symbol of a second definition associated with a second object file, the first object file is optimized based on a first segment associated with the first definition in the first object file and an optimization to the second object file is skipped. Next, an executable file is generated based on the optimized first object file and the second object file.

20 Claims, 5 Drawing Sheets

GENERATING EXECUTABLE FILES THROUGH COMPILER OPTIMIZATION

BACKGROUND

Technical Field

The present invention generally relates to compiler optimization, and more particularly to generating executable files based on optimized object files.

Description of the Related Art

With developments of computer technologies, there have been proposed a large number of programming languages. In software developments, developers first write source code in source files in a programming language, and then the source code are compiled into object files. Usually, compiling a source file involves a number of processing steps. For example, front-end processing may comprise lexical analysis, syntax analysis, semantic analysis, intermediate code generation, and the like; while back-end processing involves code optimization and code generation. Therefore, it might take considerable time to compile the source files.

Compilers play very critical roles to improve the runtime performance of various applications today. Once all source files have been compiled separately into object files, the compiler links the object files into a single file to generate an executable file. To gain a better runtime performance, high level optimizations are used in the compiler.

SUMMARY

In an embodiment according to the present principles, a computer-implemented method is proposed. According to the method, a first symbol of a first definition associated with a first object file is obtained. Then, in response to the first symbol matching a second symbol of a second definition associated with a second object file, the first object file is optimized based on a first segment associated with the first definition in the first object file and an optimization to the second object file is skipped. Next, an executable file is generated based on the optimized first object file and the second object file.

In another embodiment according to the present principles, a computing system is proposed. The computing system comprises a computer processor coupled to a computer-readable memory unit, the memory unit comprising instructions that when executed by the computer processor implements a method. In the method, a first symbol of a first definition associated with a first object file is obtained. Then, in response to the first symbol matching a second symbol of a second definition associated with a second object file, the first object file is optimized based on a first segment associated with the first definition in the first object file and an optimization to the second object file is skipped. Next, an executable file is generated based on the optimized first object file and the second object file.

In yet another embodiment according to the present principles, a computer program product is proposed. The computer program product is tangibly stored on a non-transient machine readable medium and comprising executable instructions which, when executed on an electronic device, cause the electronic device to: obtain a first symbol of a first definition associated with a first object file; in response to the first symbol matching a second symbol of a second definition associated with a second object file, optimize the first object file based on a first segment associated with the first definition in the first object file and skipp an optimization to the second object file; and generate an executable file based on the optimized first object file and the second object file.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein.

Throughout the drawings, same or similar reference numerals represent the same or similar elements.

DETAILED DESCRIPTION

Principle of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
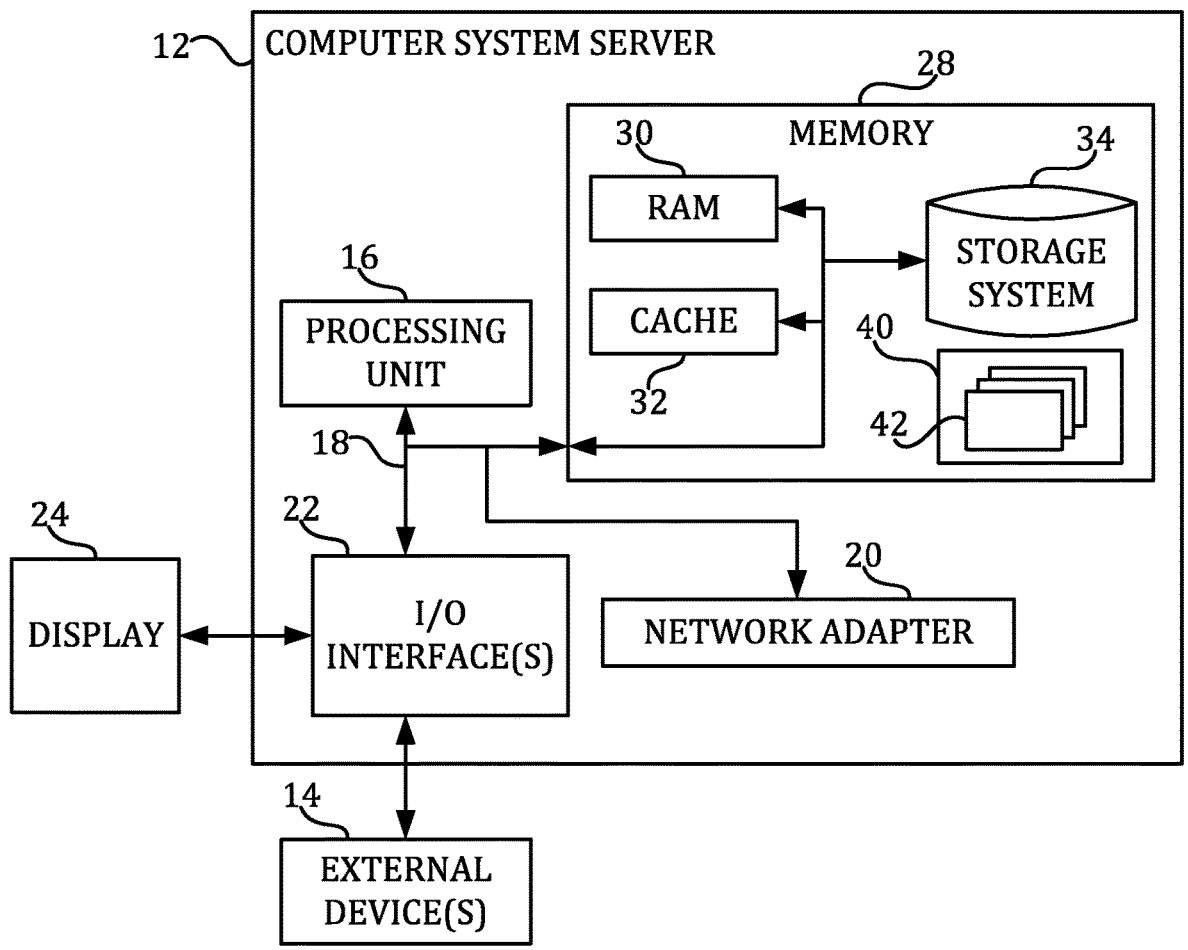
FIG. 1 schematically illustrates an example computer system/server which is applicable to implement embodiments of the present invention.

Reference is first made to FIG. 1, in which an example electronic device or computer system/server 12, which is applicable to implement the embodiments of the present invention, is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Some approaches have been developed to optimize operations of the compliers. For example, Interprocedural optimization (IPO) is adopted in modern compliers. IPO refers to a collection of compiler techniques used in computer programming to improve performance of programs containing many frequently used functions of small or medium length. IPO differs from other compiler optimization because it analyzes the entire program, while other optimizations look at only a single function, or even a single block of code.

In this approach, the executable file resulting from the IPO provides higher efficiency during runtime, but the IPO procedure makes compilation time rise sharply. Sometimes, the compiler wastes considerable compilation time on some useless compilation procedures. Especially, when a template is used in the source code, more time will be cost in performing IPO on the codes related to the template. Tables 1-3 illustrate three source files included in a programming project and the following paragraphs will describe the situation by example of the code in Tables 1-3.

TABLE 1

| Source File: "w.hpp" |
| --- |
| template <typename T><br>T comp_func(T a, T b){<br>    return a < b;<br>} |

TABLE 2

| Source File: "a.cpp" |
| --- |
| #include "w.hpp"<br>int funcA(int a, int b){<br>    int ret = comp_func(a,b);<br>    return ret;<br>} |

TABLE 3

| Source File: "b.cpp" |
| --- |
| #include "w.hpp"<br>int funcB(int a, int b){<br>    int ret = comp_func(a,b);<br>    return ret;<br>} |

In this programming project, the head file "w.hpp" is included in the source files "a.cpp" and "b.cpp," respectively, and the template function comp_func( ) defined in "w.hpp" is called in both of "a.cpp" and "b.cpp." As "a.cpp" and "b.cpp" refer to the same template function comp_func( ) when "a.cpp" and "b.cpp" are compiled into the object files "a.o" and "b.o" respectively, the segments associated with comp_func( ) in both object files are the same.

Figure 2:
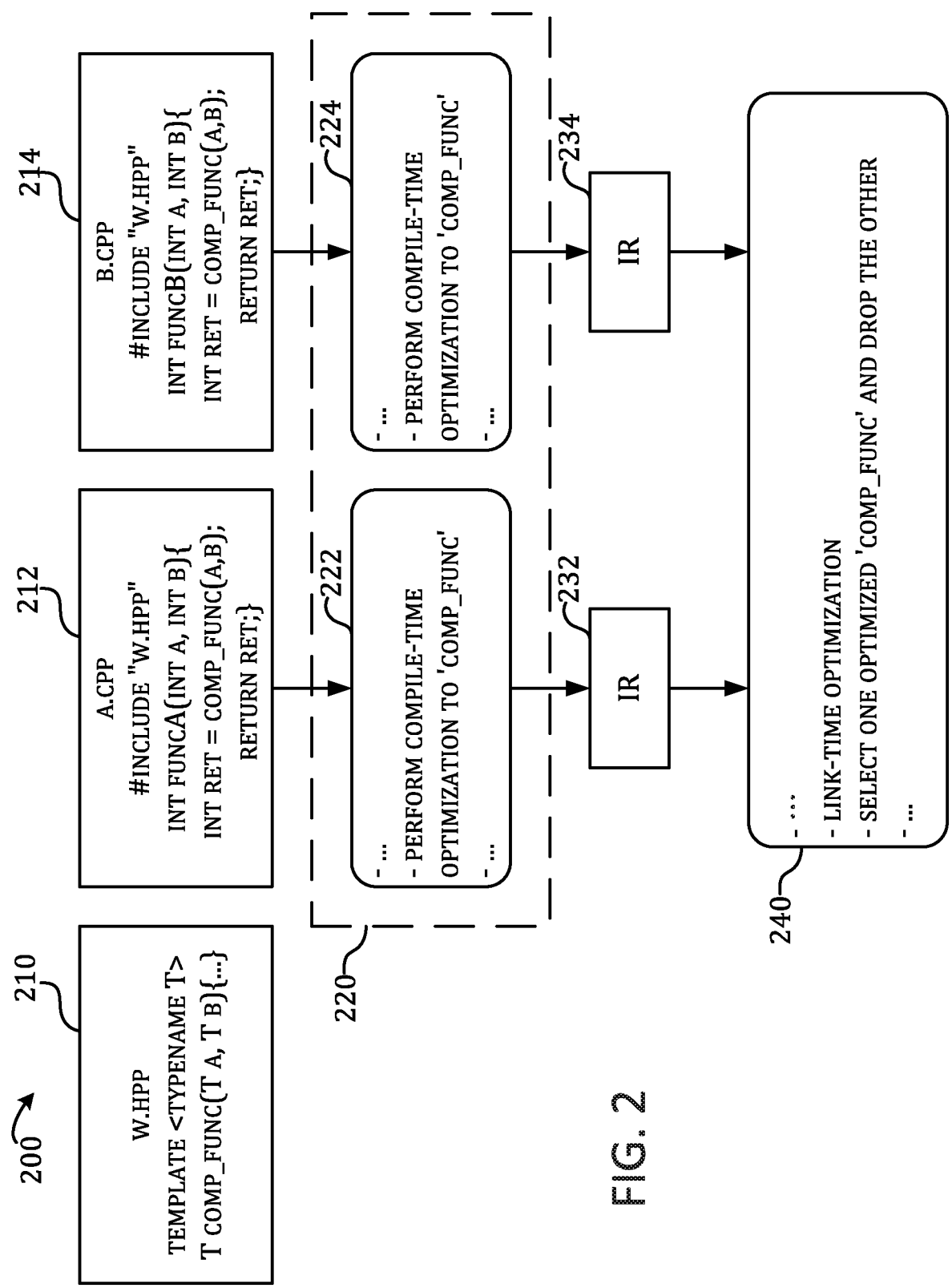
FIG. 2 schematically illustrates a block diagram of a technical solution for a code optimization in a compiler.

FIG. 2 schematically illustrates a block diagram of a technical solution of a code optimization for the above source files. As illustrated in FIG. 2, the source file 210 "w.hpp" defines a template "comp_func( )" and the source files 212 "a.cpp" and 214 "b.cpp" include the "w.hpp" and call the template function "comp_func( )" As both of "a.cpp" and "b.cpp" call the same template function instantiation, during the compiling produce, the template function instantiation called in both files produces two identical code segments and the two identical code segments need to be optimized separately in the IPO procedure for a.cpp and b.cpp, thereby unnecessary time and resource are caused.

Usually, the IPO procedure may be divided into a compile-time optimization stage 220 and a link-time optimization stage 240. In the compile-time optimization stage 220, as illustrated in block 222, the complier performs compile-time optimization to the segment associated with "comp_func( )" in the source file 212. Meanwhile as illustrated in block 224, the complier also performs compile-time optimization to the segment associated with "comp_func( )" in the source file 214. Next, the Intermediate Representations (IRs) 232 and 234 resulting from blocks 222 and 224 are further subjected to a link-time optimization stage 240. In the link-time optimization stage 240, only one optimized segment associated with "comp_func( )" is selected randomly from the IRs 232 and 234 (for example, the first one may be selected), while the other may be dropped, because the two optimized code segments associated with "comp_func( )" are exactly the same.

Although the optimizations illustrated in blocks 222 and 224 may be implemented in parallel, unnecessary time and resource are wasted in the compiler. Further, optimizing the useless/duplicated codes will introduce heavy workload to the complier and thus greatly decrease the efficiency. In view of these problems, it demands prompt solution as to how to reduce the time for compiling and optimization and further increasing the compiling efficiency.

According to an embodiment of the present invention, there is proposed a computer-implemented method. In the method, a first symbol of a first definition associated with a first object file is obtained. Then, in response to the first symbol matching a second symbol of a second definition associated with a second object file, the first object file is optimized based on a first segment associated with the first definition in the first object file and an optimization to the second object file is skipped. Next, an executable file is generated based on the optimized first object file and the second object file.

According to the proposed method, not all of the code segments in the object files are optimized. Instead, with respect to code segments associated with the same definition (for example, a template function instantiation), only one code segment is subjected to the compile-time optimization, while the compile-time optimization for other code segments may be omitted, such that time and computing resources may be saved.

Figure 3:
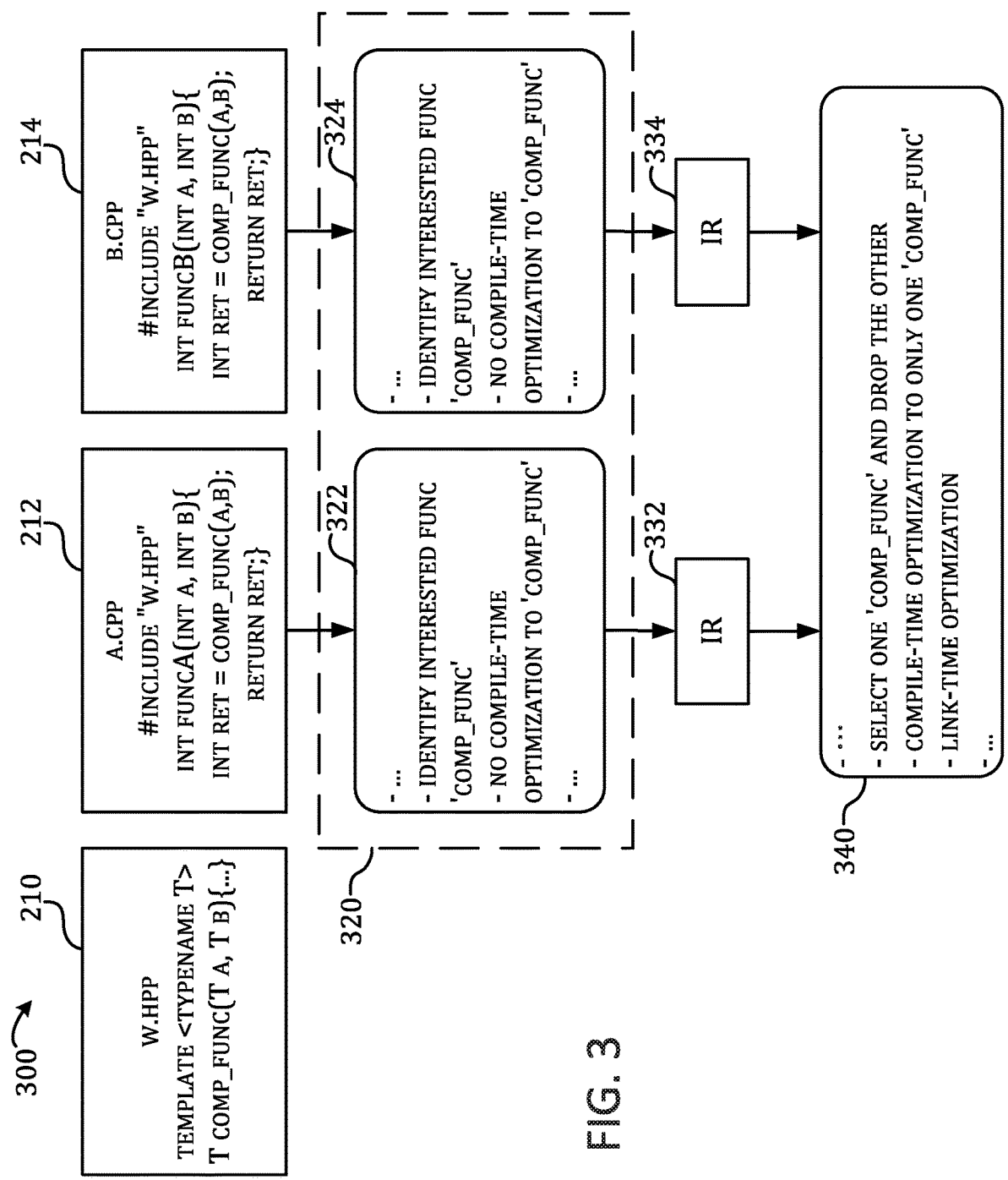
FIG. 3 schematically illustrates a block diagram of a technical solution for a code optimization in a compiler according to an embodiment of the present invention.

FIG. 3 schematically illustrates a block diagram of a technical solution for code optimization in a compiler according to an embodiment of the present invention. Details of the embodiments of the present invention will be described by taking the source code in Tables 1-3 as examples. Although the source files are written in C++ programming language, it is appreciated that the method of the present invention may be applied to the complier for other programming languages.

As illustrated in FIG. 3, the attributes of the functions may be identified. In this figure, reference numbers 210, 212 and 214 have the same definitions as those in FIG. 2. If the source files call the same function, then the functions called in the source files 212 and 214 may be considered as the interested definitions according to the present invention. Whether the functions are interested ones may be determined based on the symbol of the functions and details will be described hereinafter. Further, in the compile-time optimization stage 320, blocks 322 and 324 show the compile-time optimizations to the segments associated with "comp_func( )" in the source files 212 and 214, respectively. In this figure, the interested definitions will not go through the compile-time optimization. Next, the IRs 332 and 334 may be inputted into the link-time optimization stage 340, and one "comp_func( )" may be selected and the other one may be dropped. Further, the compile-time optimization may be implemented to one of the interested definitions of the same template function.

Based on the above, the compile-time optimization is performed on the segment associated with only one of the interested definitions thereby the cost for optimizing all of the interested definitions may be reduced. Compared with what is illustrated in FIG. 2, the overall cost associated with the compile-time optimization of the template function is reduced to ½=50% by using the proposed invention. Although FIG. 3 illustrates a situation where the same template function comp_func ( ) is called in two source files, if the comp_func ( ) is called in four source files, then the overall cost associated with the template function for the IPO may further be reduced to ¼=25%. It is appreciated that the above paragraphs describe the embodiments of the present invention with template functions as examples of the definitions, in other embodiments, the definition may relate to other objects such as a template class and the like.

Figure 4:
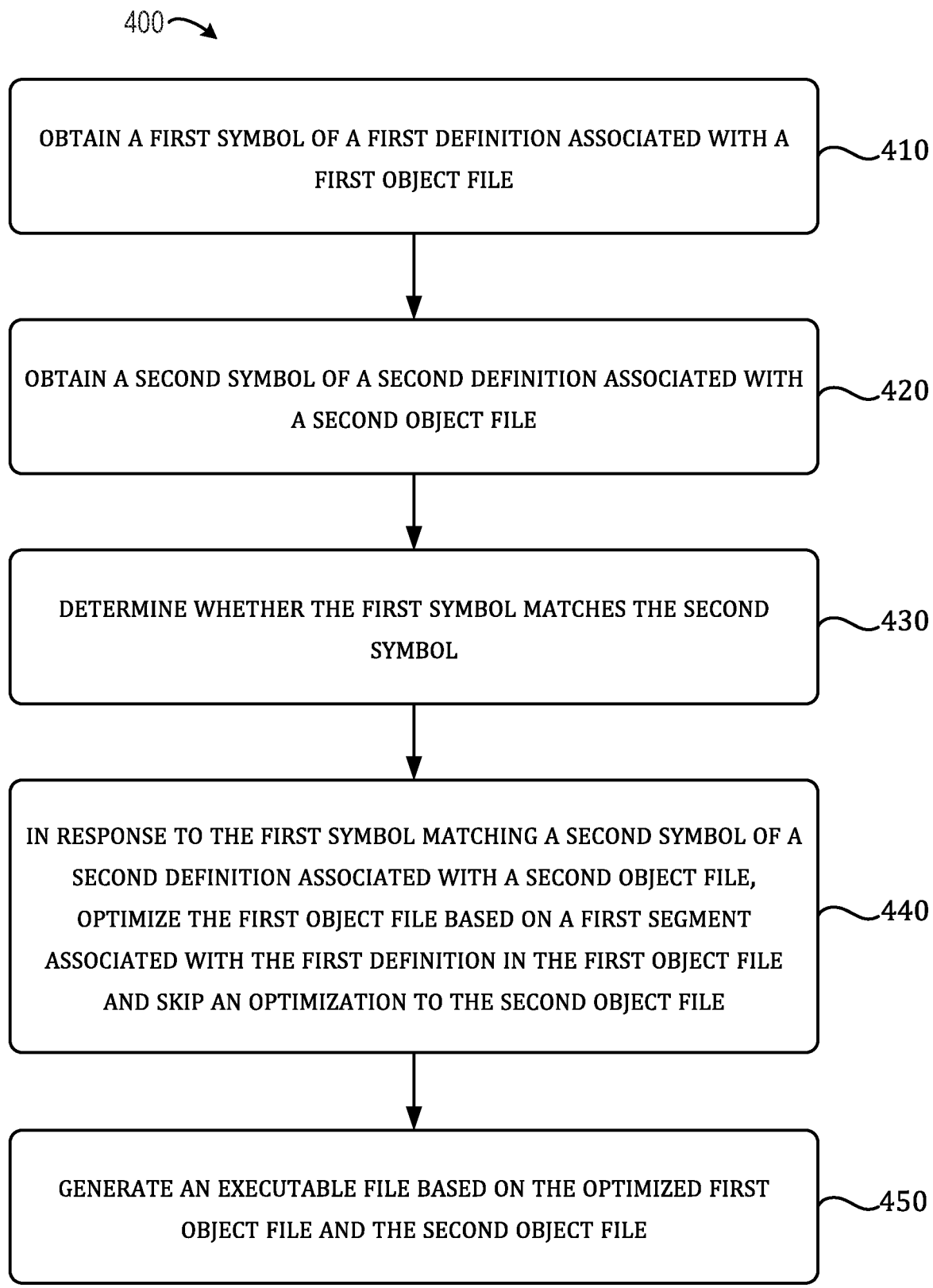
FIG. 4 schematically illustrates a flowchart of a method for a code optimization in a compiler according to an embodiment of the present invention.

FIG. 4 schematically illustrates a flowchart of a method for a code optimization in a compiler according to an embodiment of the present invention. In block 410, a first symbol of a first definition associated with a first object file may be obtained. As illustrated in Tables 2 and 3, the source files "a.cpp" and "b.cpp" call the template function comp_func ( ). After compilation, the source files are converted into object files, where the definition comp_func ( ) called in each source file is mapped into a symbol in the IR generated in compiler. The object files may also contain the IRs produced by compiler in the compile-time optimization. Based on the IRs, the compiler can know which function symbols have been marked as interested definitions of the present invention. Here the function symbol is a unique signature of the function like template function.

In block 420, a second symbol of a second definition associated with a second object file may be obtained.

In block 430, whether or not the first symbol matches the second symbol may be determined.

In block 440, in response to the first symbol matching a second symbol of a second definition associated with a second object file, the first object file is optimized based on a first segment associated with the first definition in the first object file and an optimization to the second object file is skipped. According to the embodiment of the present invention, whether the first and second definitions are the same template function instantiation may be judged by comparing the first and second symbols. If there is a match between the two symbols (for example, the two symbols are identical), then the code segment associated with one definition may be selected to go through the compile-time optimization. As the first and second definitions are identical, any of the definition may be selected for the optimization.

In this step, if the first and second symbols are identical, then the segment associated with one definition may be optimized by the compile-time optimization. In this manner, only one of the template function instantiation is optimized and thus the time and computing resources may be reduced.

In block 450, an executable file may be generated based on the optimized first object file and the second object file. After the compile-time optimization in block 440, segment associated with the first definition in the first object file has been optimized and the segment associated with the second definition in the second object file may be dropped. At this point, the executable file may be generated. In this embodiment, only one segment associated with the template function comp_func( ) goes through the compile-time optimization, thereby the total cost of the optimization in the compiler may be reduced.

According to an embodiment of the present invention, the first symbol may be obtained from a first intermediate representation, where the intermediate representation may be generated by compiling a first source file included in a programming project for generating the first object file. In this embodiment, and the second object file is generated by compiling a second source file included in the programming project. In other words, the intermediate representation is an intermediate file generated between the source file and the object file.

In the above example of Tables 2 and 3, "a.cpp" and "b.cpp" are source files in one programming project, and are converted into the object files "a.o" and "b.o" respectively in the compiler. With IPO, an IR may be generated during the compiling procedure. It is appreciated that the IR file includes information about program symbols. The IR includes a data structure used by a language translator such as a compiler or interpreter, where each identifier in the source code is associated with information relating to its declaration or appearance in the source. Tables 4 and 5 illustrate the symbol tables in the IRs for "a.cpp" and "b.cpp" as below.

TABLE 4

Symbol Table in IR for "a.cpp"

| No. | ... | Binding | ... | Name |
|---|---|---|---|---|
| 1: | ... | LOCAL | ... | a.cpp |
| 2: | ... | WEAK | ... | _Z9comp_funcIiET_S0_S0_ |
| 3: | ... | GLOBAL | ... | _Z5funcAii |

TABLE 5

Symbol Table in IR for "b.cpp"

| No. | ... | Binding | ... | Name |
|---|---|---|---|---|
| 1: | ... | LOCAL | ... | b.cpp |
| 2: | ... | WEAK | ... | _Z9comp_funcIiET_S0_S0_ |
| 3: | ... | GLOBAL | ... | _Z5funcBii |

In Table 4, the line "2: . . . WEAK . . . _Z9comp_funcIiET_S0_S0_" shows an entry for the call of "comp_func( )" in "a.cpp," where the symbol name for "comp_func( )" in "a.cpp" is "_Z9comp_funcIiET_S0_S0_." Further, In Table 5, the line "2: . . . WEAK . . . _Z9comp_funcIiET_S0_S0_" shows an entry for the call of "comp_func( )" in "b.cpp," where the symbol name for "comp_func( )" in "b.cpp" is "_Z9comp_funcIiET_S0_S0_." In this example, the first and second symbols respectively obtained from the IRs are both "_Z9comp_funcIiET_S0_S0_" and there is a match between the first and second symbols.

Besides the symbol of the definition, the IR also records other attributes of the definition. For example, the binding attributes show the template instantiations are "weak symbols" in Tables 4 and 5, which means that multiple definitions are allowed. At this point, the linker assumes all definitions are really the same and then picks one at random (probably consistently the first one or the last one, but only as a coincidence of the implementation), and only one definition may be randomly selected for the optimization and other definitions may be discarded. According to Tables 4 and 5, the binding attributes for both of the functions comp_func( ) are "WEAK," and thus one segment associated with comp_func( ) may be selected from one IR for the compile-time optimization.

It is appreciated that the above example of the "WEAK" symbol illustrates one example situation that the template functions may be processed by the method of the embodiment of the present invention. In other situations, other types of functions, such as the hidden/internal visibility functions, may be processed by the method of another embodiment.

The visibility of the symbol takes effect at dynamic linking time since shared libraries are commonly loaded as part of memory image at program runs, and the visibility comes to be an attribute for all global symbols for dynamic linking. Besides the binding attribute as described above, the hidden/internal visibility may also indicate whether redundancy is involved to a certain extent. Accordingly, the hidden/internal visibility functions may also be identified as interested functions.

In order to identify the potential functions that may adopt the method of the embodiment of the present invention, an "INTERESTED" flag may be added into the symbol table of the IR. For example, the "INTERESTED" flag may be set to "TRUE" in response to the binding attributes in the first and second symbols being "WEAK." For another example, the "INTERESTED" flag may be set to "TRUE" based on the hidden/internal visibility associated with the first and second symbols. Further, with developments of the compiling and programming techniques, other attributes may be gradually added during the compiling and linking procedure. At this point, other new attributes may also considered in determining the value of the "INTERESTED" flag, as long as these attributes indicates that redundancy exists between the segments in the object files.

According to an embodiment of the present invention, in response to attributes of the first and second symbols indicating a redundancy between the first and second segments, the first segment associated with the first definition in the first object file may be optimized by performing a compile-time optimization. In this embodiment, the symbol tables as illustrated in Tables 4 and 5 may be revised to include an "INTERESTED" flag. For example, the second column of "Binding" may be modified to "INTERESTED," and the value of the "INTERESTED" flag may be determined based on the binding and visibility attributes. In another embodiment, the name of the flag may be different, as long as the flag may indicate whether a redundancy exists between the first and second segments.

According to an embodiment of the present invention, the second object file may be optimized by removing a second segment associated with the second definition in the second object file; and the executable file may be generated by linking the optimized first object file and the optimized second object file. In this example, the first segment associated with the first definition in the first object file has been optimized, and the second segment associated with the second definition in the object file may be removed because multiple definitions are allowed and the first and second segments are identical. Afterwards, the optimized first object file and the optimized second object file may go through other types of optimization and then the executable file may be generated.

The embodiments of the present invention reschedule the time points and targets for the compile-time optimization. Meanwhile, other types of optimization may also be performed. According to an embodiment of the present invention, a link-time optimization may be performed to the optimized first object file and the optimized second object files during the linking. With the link-time optimization, the object files after the compile-time optimization may provide the executable file with better performance.

Link-time optimization is a type of program optimization performed by a compiler to a program at link time. A compiler with link-time optimization capabilities can apply various forms of IPO to the newly merged file during the link-time optimization. The process of link-time optimization may remove the knowledge limitations that occurred in the earlier stages of compilation, allowing for deeper analysis, more optimization, and ultimately better program performance.

Once all source files have been compiled separately into object files, a compiler links (merges) the object files into a single file, the executable file. As it is in the process of doing this (or immediately thereafter) a compiler with link-time optimization capabilities can apply various forms of IPO to the newly merged file. The process of merging the files may have removed the knowledge limitations that occurred in the earlier stages of compilation, allowing for deeper analysis, more optimization, and ultimately better program performance.

If the first and second source files call different functions, then the first and second symbols are different and thus cannot match. At this point, both of the first and second object files should be optimized. According to an embodiment of the present invention, in response to the first symbol not matching the second symbol, the first and second object files may be optimized by a compile-time optimization respectively; then the executable file may be generated by linking the optimized first object file and the optimized second object file.

The above embodiment shows a situation where the source files do not involve definitions that are referring to a same template. For example, "a.cpp" and "b.cpp" may include one or more definitions respectively, while any two of these definitions are separately declared instead of referring to a same template. At this point, segments associated with respective definitions in the object files may be optimized separately according to the traditional manner and then the optimized results may be linked for generating an executable file.

According to an embodiment of the present invention, the IRs may be scanned to check if definitions that refer to the same template function are included in the IR. For example, the corresponding portions of the IRs may be compared to find entries with identical symbol name. Further, if attributes in the found entries are "INTERESTED," then it is determined that the definitions associated with the two entries refer to the same template function. Next, the segment in one object file should go through the compile-time optimization.

According to an embodiment of the present invention, a link-time optimization may be performed to the optimized first object file and the optimized second object files during the linking. In this embodiment, the optimized object files after the compile-time optimization may go through the link-time optimization for better performance.

The above paragraphs describe the steps for optimizing the segments associated with definitions referring to the same template function in the object files. Besides reference to the template function, other ordinary definitions may exist in the source files thereby in the object files. With regard to these ordinary definitions, regular optimizations may be performed.

According to an embodiment of the present invention, a third segment in the first object file other than the first segment may be optimized by a compile-time optimization. According to an embodiment of the present invention, a fourth segment in the second object file other than the second segment may be optimized by a compile-time optimization.

Figure 5:
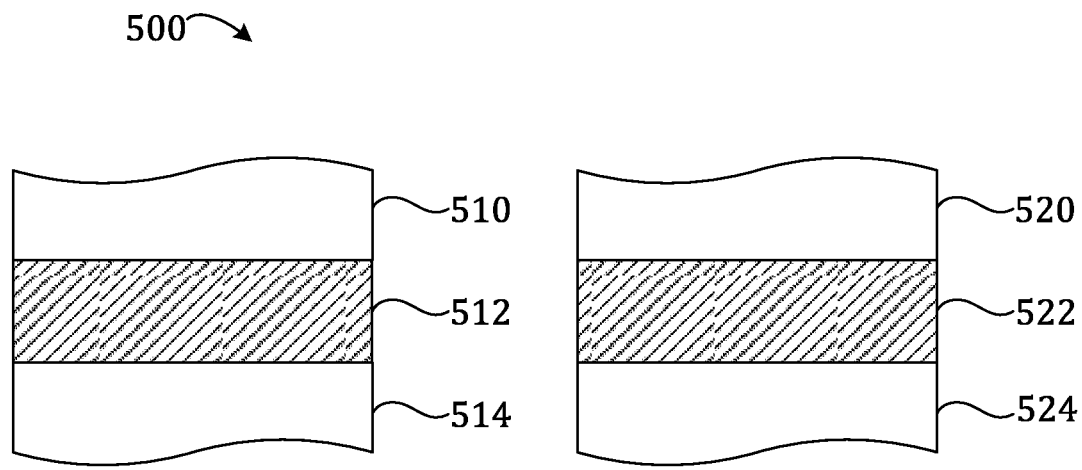
FIG. 5 schematically illustrates a block diagram of optimizing segments included in two object files according to an embodiment of the present invention.

FIG. 5 schematically illustrates a block diagram of optimizing segments included in two object files according to an embodiment of the present invention. In FIG. 5, segments 510, 512 and 514 are included in the first object file, and segments 520, 522 and 524 are included in the second object file. The segments 510, 514, 520 and 524 are associated with ordinary functions, and the segment 512 is associated with the first function and the segment 522 is associated with the second function. When the first and second functions refer to the same template function (such as the comp_func ( )), the segments 512 and 522 may be proceeded according to the method of the embodiment of the present invention, while the other segments may be proceeded in the traditional manner.

During the optimization procedure, as the segments 512 and 522 are associated with the same template function, one segment such as segment 512 may be selected for the compile-time optimization, while the other segment 522 may be directly dropped and the compile-time optimization may be skipped for the segment 522. Regarding the segments 510, 514 in the first object file and the segments 520 and 524 in the second object file, these segments may be optimized according to the traditional compile-time optimization. Further, the optimized first and second object files may go through the link-time optimization.

Figure 6:
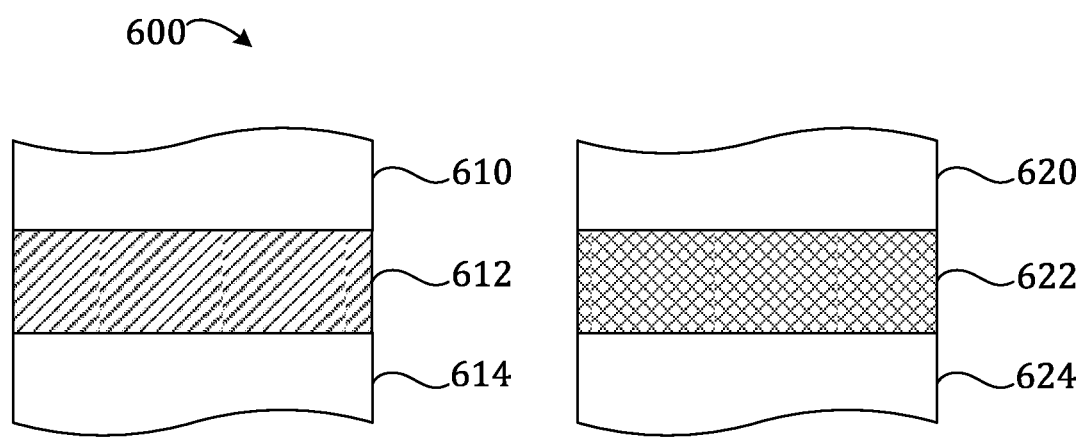
FIG. 6 schematically illustrates a block diagram of optimizing segments included in two object files according to an embodiment of the present invention.

FIG. 6 schematically illustrates a block diagram of optimizing segments included in two object files according to an embodiment of the present invention. In FIG. 6, segments 610, 612 and 614 are included in the first object file, and segments 620, 622 and 624 are included in the second object file. If the segments 512 and 522 do not refer to the same template function, then all the segments in the first and second object files may go through the traditional compile-time optimization. Further, the optimized first and second object files may be subject to the link-time optimization.

Although the above paragraphs describe the workflow of the embodiment of the present invention with an example including two object files, in another embodiment, more than two object files that call the same template function may be involved in and only one object file may be subject to the compile-time optimization.

In the above paragraphs, the embodiments of the present invention are described with an example where only one template function is included in the ".hpp" source file. In another example, there may be multiple template functions in the ".hpp" source file. Tables 6-8 illustrate three source files included in a programming project.

TABLE 6

Source File: "ww.hpp"

template <typename T>
T comp_func(T a, T b){
   return a < b;
}
template <typename T>

TABLE 6-continued

Source File: "ww.hpp"

```
T comp_func2(T a, T b){
    return a > b;
}
```

TABLE 7

Source File: "aa.cpp"

```
#include "ww.hpp"
int funcA(int a, int b){
    int ret = comp_func(a,b);
    return ret;
}
int funcA2(int a, int b){
    int ret = comp_func2(a,b);
    return ret;
}
```

TABLE 8

Source File: "b.cpp"

```
#include "ww.hpp"
int funcB(int a, int b){
    int ret = comp_func(a,b);
    return ret;
}
int funcB2(int a, int b){
    int ret = comp_func2(a,b);
    return ret;
}
```

In this example, two template functions comp_func( ) and comp_func2( ) are defined in "ww.hpp," and the two template functions are referred to in both of the source files "aa.cpp" and "bb.cpp" respectively. At this point, only one segment associated with comp_func( ) and only one segment associated with comp_func2( ) need to go through the compile-time optimization. For example, the segments respectively associated with comp_func( ) and comp_func2( ) in the object file resulting from "aa.cpp" may be optimized; alternatively, the segment associated with comp_func( ) in the object file resulting from "aa.cpp" and the segment associated with comp_func2( ) in the object file resulting from "bb.cpp" may be optimized.

With the embodiments of the present invention, the time points and targets may be rescheduled for the compile-time optimization, such that only one copy of the segments associated with the interested definitions may be optimized. In these embodiments, the time for compiling and optimization may be reduced thereby the efficiency is increased in the compiler.

Various embodiments implementing the method of the embodiment of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus/system based on the same invention concept. Even if the apparatus/system has the same hardware structure as a general-purpose processing device, the functionality of software contained therein makes the apparatus/system manifest distinguishing properties from the general-purpose processing device, thereby forming an apparatus/system of the various embodiments of the present invention. The apparatus/system described in the present invention comprises several means or modules, the means or modules configured to execute corresponding steps. Upon reading this specification, those skilled in the art may understand how to write a program for implementing actions performed by these means or modules. Since the apparatus/system is based on the same invention concept as the method, the same or corresponding implementation details are also applicable to means or modules corresponding to the method. As detailed and complete description has been presented above, the apparatus/system is not detailed below.

According to an embodiment of the present invention, a computing system is proposed. The computing system comprises a computer processor coupled to a computer-readable memory unit, the memory unit comprising instructions that when executed by the computer processor implements a method. In the method, a first symbol of a first definition associated with a first object file is obtained. Then, in response to the first symbol matching a second symbol of a second definition associated with a second object file, the first object file is optimized based on a first segment associated with the first definition in the first object file and an optimization to the second object file is skipped. Next, an executable file is generated based on the optimized first object file and the second object file.

In an embodiment of the present invention, the first symbol may be obtained from a first intermediate representation, where the first intermediate representation may be generated by compiling a first source file included in a programming project for generating the first object file.

In an embodiment of the present invention, in response to attributes in the first and second symbols indicating a redundancy between the first and second segments, the first segment associated with the first definition in the first object file may be optimized by performing a compile-time optimization.

In an embodiment of the present invention, the second object file may be optimized by removing a second segment associated with the second definition in the second object file; and the executable file may be generated by linking the optimized first object file and the optimized second object file.

In an embodiment of the present invention, a link-time optimization may be performed to the optimized first object file and the optimized second object file during the linking.

In an embodiment of the present invention, in response to the first symbol not matching the second symbol, the first and second object files may be optimized by a compile-time optimization respectively; and the executable file may be generated by linking the optimized first and second object files.

In an embodiment of the present invention, a link-time optimization may be performed to the optimized first object file and the optimized second object files during the linking.

In an embodiment of the present invention, a third segment in the first object file other than the first segment may be optimized by a compile-time optimization.

In an embodiment of the present invention, a fourth segment in the second object file other than the second segment may be optimized by a compile-time optimization.

According to an embodiment of the present invention, a computer program product is proposed. The computer program product is tangibly stored on a non-transient machine-readable medium and comprising machine-executable instructions. The instructions, when executed on an electronic device, cause the electronic device to: obtain a first symbol of a first definition associated with a first object file; in response to the first symbol matching a second symbol of a second definition associated with a second object file, optimize the first object file based on a first segment associated with the first definition in the first object file and skip an optimization to the second object file; and generate an executable file based on the optimized first object file and the second object file.

In an embodiment of the present invention, the instructions further cause the electronic device to: obtain the first symbol from a first intermediate representation, the first intermediate representation being generated by compiling a first source file included in a programming project for generating the first object file.

In an embodiment of the present invention, the instructions further cause the electronic device to: in response to attributes in the first and second symbols indicating a redundancy between the first and second segments, optimize the first segment associated with the first definition in the first object file by performing a compile-time optimization.

In an embodiment of the present invention, the instructions further cause the electronic device to: optimize the second object file by removing a second segment associated with the second definition in the second object file; and generate the executable file by linking the optimized first object file and the optimized second object file.

In an embodiment of the present invention, the instructions further cause the electronic device to: perform a link-time optimization to the optimized first object file and the optimized second object files during the linking.

In an embodiment of the present invention, the instructions further cause the electronic device to: in response to the first symbol not matching the second symbol, optimize the first and second object files by a compile-time optimization respectively; and generate the executable file by linking the optimized first and second object files.

In an embodiment of the present invention, the instructions further cause the electronic device to: perform a link-time optimization to the optimized first object file and the optimized second object files during the linking.

In an embodiment of the present invention, the instructions further cause the electronic device to: optimize a third segment in the first object file other than the first segment by a compile-time optimization.

In an embodiment of the present invention, the instructions further cause the electronic device to: optimize a fourth segment in the second object file other than the second segment by a compile-time optimization.

Moreover, the system may be implemented by various manners, including software, hardware, firmware or a random combination thereof. For example, in some embodiments, the apparatus may be implemented by software and/or firmware. Alternatively or additionally, the system may be implemented partially or completely based on hardware. for example, one or more units in the system may be implemented as an integrated circuit (IC) chip, an application-specific integrated circuit (ASIC), a system on chip (SOC), a field programmable gate array (FPGA), etc. The scope of the present intention is not limited to this embodiment.

The embodiment of the present invention may be a system, an apparatus, a device, a method, and/or a computer program product. The computer program product may include a computer readable storage medium (or media) having computer readable program instructions thereon for causing a processor to carry out aspects of the embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of generating an executable file, comprising:
   determining, using a processor, whether a first symbol having a first definition associated with a first object file matches a second symbol of a second definition associated with a second object file;
   if the first symbol matches the second symbol, optimizing the first object file based on a first segment in the first object file corresponding to the first definition and skipping optimizing the second object file based on a second segment in the second object file corresponding to the second definition; and
   generating, using the processor, an executable file based on the optimized first object file and the second object file.

2. The method as recited in claim 1, wherein the obtaining the first symbol further comprises:
   obtaining the first symbol from a first intermediate representation, the first intermediate representation being generated by compiling a first source file included in a programming project for generating the first object file.

3. The method as recited in claim 1, wherein the optimizing the first segment in the first object file further comprises:
   optimizing the first segment by performing a compile-time optimization in response to attributes of the first and second symbols indicating a redundancy between the first and second segments.

4. The method as recited in claim 1, wherein the generating the executable file further comprises:
   removing the second segment corresponding to the second definition;
   optimizing the second object file after removing the second segment corresponding to the second definition; and
   generating the executable file by linking the optimized first object file and the optimized second object file.

5. The method as recited in claim 4, wherein the generating the executable file further comprises:
   performing a link-time optimization to the optimized first object file and the optimized second object files during the linking.

6. The method as recited in claim 1, further comprising:
   if the first symbol does not match the second symbol, optimizing the first and second object files by a compile-time optimization respectively; and
   generating the executable file by linking the optimized first and second object files.

7. The method as recited in claim 6, wherein the generating the executable file further comprises:
   performing a link-time optimization to the optimized first object file and the optimized second object files during the linking.

8. The method as recited in claim 1, further comprising:
   optimizing a third segment in the first object file other than the first segment by a compile-time optimization.

9. A system for generating an executable file, comprising:
   a memory; and
   a processor coupled to the memory, the processor being configured to:

determine whether a first symbol having a first definition associated with a first object file matches a second symbol of a second definition associated with a second object file;

if the first symbol matches the second symbol, optimize the first object file based on a first segment in the first object file associated with the first definition and skipping optimizing the second object file based on a second segment in the second object file associated with the second definition; and generate an executable file based on the optimized first object file and the second object file.

10. The system as recited in claim 9, wherein the processor is further configured to:

obtain the first symbol from a first intermediate representation, the first intermediate representation being generated by compiling a first source file included in a programming project for generating the first object file.

11. The system as recited in claim 9, wherein the processor is further configured to:

optimize the first segment associated with the first definition in the first object file by performing a compile-time optimization in response to attributes of the first and second symbols indicating a redundancy between the first and second segments.

12. The system as recited in claim 9, wherein the processor is further configured to:

optimize the second object file after removing the second segment associated with the second definition in the second object file; and generate the executable file by linking the optimized first object file and the optimized second object file.

13. The system as recited in claim 12, wherein the processor is further configured to:

perform a link-time optimization to the optimized first object file and the optimized second object files during the linking.

14. The system as recited in claim 9, wherein the processor is further configured to:

if the first symbol does not match the second symbol, optimize the first and second object files by a compile-time optimization respectively; and generate the executable file by linking the optimized first and second object files.

15. The system as recited in claim 14, wherein the processor is further configured to:

perform a link-time optimization to the optimized first object file and the optimized second object files during the linking.

16. A non-transitory computer readable storage medium comprising a computer readable program for generating an executable file, wherein the computer readable program when executed on a computer causes the computer to perform the steps of:

determining, using a processor, whether a first symbol having a first definition associated with a first object file matches a second symbol of a second definition associated with a second object file;

if the first symbol matches the second symbol, optimizing the first object file based on a first segment in the first object file corresponding to the first definition and skipping optimizing the second object file based on a second segment in the second object file corresponding to the second definition; and generating, using the processor, an executable file based on the optimized first object file and the second object file.

17. The non-transitory computer readable storage medium as recited in claim 16, wherein the computer readable program when executed on a computer causes the computer to further perform the step of:

obtaining the first symbol from a first intermediate representation, the first intermediate representation being generated by compiling a first source file included in a programming project for generating the first object file.

18. The non-transitory computer readable storage medium as recited in claim 16, wherein the computer readable program when executed on a computer causes the computer to further perform the step of:

optimizing the first segment associated with the first definition in the first object file by performing a compile-time optimization in response to attributes of the first and second symbols indicating a redundancy between the first and second segments.

19. The non-transitory computer readable storage medium as recited in claim 16, wherein the computer readable program when executed on a computer causes the computer to further perform the steps of:

optimizing the second object file by removing a second segment associated with the second definition in the second object file; and generating the executable file by linking the optimized first object file and the optimized second object file.

20. The non-transitory computer readable storage medium as recited in claim 19, wherein the computer readable program when executed on a computer causes the computer to further perforin the step of:

performing a link-time optimization to the optimized first object file and the optimized second object files during the linking.

* * * * *